(12) United States Patent
Tai et al.

(10) Patent No.: US 9,321,912 B2
(45) Date of Patent: Apr. 26, 2016

(54) HALOGEN-FREE FLAME RETARDANT THERMOPLASTIC COMPOSITIONS FOR WIRE AND CABLE APPLICATIONS

(75) Inventors: Xiang Yang Tai, Shanghai (CN); Yabin Sun, Shanghai (CN); Yurong Cao, Shanghai (CN); Li Qiang Fan, Shanghai (CN); Lin Fu, Hillsborough, NJ (US); Geoffrey D. Brown, Bridgewater, NJ (US); Manish Mundra, Somerset, NJ (US)

(73) Assignee: Dow Global Technologies LLC, Midland, MI (US)

( * ) Notice: Subject to any disclaimer, the term of this patent is extended or adjusted under 35 U.S.C. 154(b) by 19 days.

(21) Appl. No.: 13/518,635

(22) PCT Filed: Dec. 31, 2009

(86) PCT No.: PCT/CN2009/076337
§ 371 (c)(1),
(2), (4) Date: Jun. 22, 2012

(87) PCT Pub. No.: WO2011/079457
PCT Pub. Date: Jul. 7, 2011

(65) Prior Publication Data
US 2012/0261163 A1 Oct. 18, 2012

(51) Int. Cl.
*C08K 5/3462* (2006.01)
*C08K 5/3492* (2006.01)
*C08L 23/12* (2006.01)
*H01B 7/24* (2006.01)
*C08L 23/10* (2006.01)
*C08L 23/08* (2006.01)
*C08L 23/14* (2006.01)
*C08L 53/00* (2006.01)
*H01B 7/295* (2006.01)
*C08K 5/52* (2006.01)
*C08K 5/5399* (2006.01)

(52) U.S. Cl.
CPC .............. *C08L 23/10* (2013.01); *C08L 23/0815* (2013.01); *C08L 23/142* (2013.01); *C08L 53/00* (2013.01); *H01B 7/295* (2013.01); *C08K 5/5205* (2013.01); *C08K 5/5399* (2013.01); *C08L 2201/02* (2013.01); *C08L 2205/02* (2013.01)

(58) Field of Classification Search
CPC .......... H01B 7/29; H01B 7/292; H01B 7/295; C08L 23/10; C08L 23/142; C08L 23/14; C08L 23/16; C08L 23/12; C08L 23/0815; C08L 2666/06; C08L 2666/24; C08L 53/00; C08L 53/02; C08L 2201/02; C08L 2205/02; C08K 5/5399; C08K 5/0066; C08K 5/5205
USPC .......................................... 174/110 R–110 E
See application file for complete search history.

(56) References Cited

U.S. PATENT DOCUMENTS

| | | | |
|---|---|---|---|
| 3,810,850 A | 5/1974 | Rowton | |
| 4,144,202 A | 3/1979 | Ashcraft et al. | |
| 4,789,699 A | 12/1988 | Kieffer et al. | |
| 5,093,422 A | 3/1992 | Himes | |
| 5,246,783 A | 9/1993 | Spenadel et al. | |
| 5,272,236 A | 12/1993 | Lai et al. | |
| 5,278,272 A | 1/1994 | Lai et al. | |
| 5,332,613 A | 7/1994 | Taylor et al. | |
| 5,504,172 A | 4/1996 | Imuta et al. | |
| 5,552,185 A * | 9/1996 | De Keyser | 427/358 |
| 5,750,600 A | 5/1998 | Nozokido et al. | |
| 5,986,028 A | 11/1999 | Lai et al. | |
| 6,190,772 B1 | 2/2001 | Yamano et al. | |
| 6,262,161 B1 | 7/2001 | Besto et al. | |
| 6,372,344 B1 | 4/2002 | Castellani et al. | |
| 6,414,068 B1 | 7/2002 | Sato et al. | |
| 6,448,499 B1 | 9/2002 | O'Brien | |
| 6,496,629 B2 | 12/2002 | Ma et al. | |
| 6,525,157 B2 | 2/2003 | Cozewith et al. | |
| 6,582,829 B1 | 6/2003 | Quinn et al. | |
| 6,673,855 B1 | 1/2004 | Braga et al. | |
| 6,714,707 B2 | 3/2004 | Rossi et al. | |

(Continued)

FOREIGN PATENT DOCUMENTS

| | | |
|---|---|---|
| CN | 1468906 | 1/2004 |
| CN | 1817956 | 8/2006 |

(Continued)

OTHER PUBLICATIONS

Potemkin, I.I., "Microphase separation in correlated random copolymers: Mean-filed theory and fluctuation corrections", Physical review E vol. 57, No. 6, Jun. 1998.

(Continued)

*Primary Examiner* — Timothy Thompson
*Assistant Examiner* — Paul McGee, III
(74) *Attorney, Agent, or Firm* — Whyte Hirschboeck Dudek S.C.

(57) ABSTRACT

Disclosed is a halogen-free, flame retardant thermoplastic resin composition based on polypropylene and one or more thermoplastic elastomers with an organic nitrogen- and/or phosphorus-based intumescent flame retardant comprising a piperazine component. The composition is processed easily to make a wire and cable sheath exhibiting a balance of high flame retardancy, good flexibility, high wet electrical resistance and excellent heat deformation properties, and which passes the VW-I flame retardancy test, the UL1581 heat deformation test at 150° C. and the wet electrical resistance test, and also exhibits good tensile and flexibility properties. Also disclosed is a wire and cable sheath made from the composition.

8 Claims, No Drawings

(56) References Cited

U.S. PATENT DOCUMENTS

| | | | |
|---|---|---|---|
| 6,753,372 | B1 | 6/2004 | Garcia Duran et al. |
| 6,756,440 | B2 | 6/2004 | Hase et al. |
| 6,960,635 | B2 | 11/2005 | Stevens et al. |
| 7,049,524 | B2 * | 5/2006 | Belli et al. ............... 174/120 R |
| 7,355,089 | B2 | 4/2008 | Chang et al. |
| 7,438,748 | B2 | 10/2008 | Cogen et al. |
| 7,504,347 | B2 | 3/2009 | Poon et al. |
| 7,514,517 | B2 | 4/2009 | Hoenig et al. |
| 7,524,911 | B2 | 4/2009 | Karjala et al. |
| 7,579,408 | B2 | 8/2009 | Walton et al. |
| 7,582,716 | B2 | 9/2009 | Liang et al. |
| 2003/0088000 | A1 | 5/2003 | Kimura et al. |
| 2004/0087235 | A1 | 5/2004 | Morman et al. |
| 2004/0122408 | A1 | 6/2004 | Potnis et al. |
| 2004/0122409 | A1 | 6/2004 | Thomas et al. |
| 2005/0171263 | A1 | 8/2005 | Kanamori et al. |
| 2005/0256234 | A1 | 11/2005 | Kurumatani et al. |
| 2006/0084740 | A1 | 4/2006 | Kao et al. |
| 2006/0167256 | A1 | 7/2006 | Kimura et al. |
| 2006/0199884 | A1 | 9/2006 | Hoenig et al. |
| 2006/0199906 | A1 | 9/2006 | Walton et al. |
| 2006/0211819 | A1 | 9/2006 | Hoenig et al. |
| 2007/0078211 | A1 | 4/2007 | Chang et al. |
| 2007/0078222 | A1 | 4/2007 | Chang et al. |
| 2007/0112127 | A1 | 5/2007 | Soediono et al. |
| 2008/0167422 | A1 | 7/2008 | Hashimoto |
| 2008/0269383 | A1 | 10/2008 | Pauquet et al. |
| 2008/0296041 | A1 | 12/2008 | Fukuchi et al. |
| 2009/0036587 | A1 | 2/2009 | Chang et al. |
| 2009/0090535 | A1 * | 4/2009 | Reyes et al. ............. 174/110 SR |
| 2009/0124743 | A1 | 5/2009 | Lee |
| 2009/0281215 | A1 | 11/2009 | Kaul |
| 2011/0011616 | A1 | 1/2011 | Brown et al. |

FOREIGN PATENT DOCUMENTS

| | | |
|---|---|---|
| CN | 101469100 | 7/2009 |
| EP | 0712892 | 5/1996 |
| EP | 1221462 | 7/2002 |
| EP | 1367094 | 12/2003 |
| EP | 2045288 A1 | 4/2009 |
| EP | 2194091 A1 | 6/2010 |
| JP | 4146944 | 5/1992 |
| JP | 2003277573 | 10/2003 |
| JP | 2007063346 | 3/2007 |
| JP | 2007084681 | 4/2007 |
| JP | 2008-063458 A | 3/2008 |
| JP | 2009185214 | 8/2009 |
| WO | 0001745 | 1/2000 |
| WO | 2004041538 | 5/2004 |
| WO | 2004044049 | 5/2004 |
| WO | 2005090427 | 9/2005 |
| WO | 2005097900 | 10/2005 |
| WO | 2008080111 | 7/2008 |
| WO | 2009016129 | 2/2009 |
| WO | 2009047353 | 4/2009 |
| WO | 2009063732 | 5/2009 |

OTHER PUBLICATIONS

Dobrynin, A.V., "Phase coexistence in random copolymers", J. Chem Phys. 107 (21), Dec. 1, 1997.
PCT International Search Report mailed on Oct. 21, 2010 for PCT App. No. PCT/CN2009/076337.
Machine translation of JP 2008-063458.

* cited by examiner

HALOGEN-FREE FLAME RETARDANT THERMOPLASTIC COMPOSITIONS FOR WIRE AND CABLE APPLICATIONS

FIELD OF THE INVENTION

Embodiments of the invention relate to compositions for wire and cable (W&C) applications. In one aspect, the invention relates to thermoplastic compositions for use in W&C sheathings, e.g., protective jackets and insulation, which are flame retardant and halogen-free.

BACKGROUND OF THE INVENTION

A key challenge in the wire and cable (W&C) flame resistant sheathing market is to provide a flame retardant composition for flexible wiring use in low voltage personnel electronic applications, including consumer electronics such as cell phone charger wire and computer data, power and accessory cords. Although current insulation materials may provide a balance of mechanical properties and flexibility, the retention on elongation after high temperature heat aging is poor and the wet electrical resistance is low.

Compositions fabricated using a single polymeric system such as polyolefins or thermoplastic elastomers (TPE) such as thermoplastic urethanes lack the necessary specifications to meet all necessary requirements for the flame retardant (FR) insulation market. Thermoplastic polyurethane (TPU)-based, halogen-free flame retardant (HFFR) compositions are typically used for wire insulation/cable jackets for personal electronics to replace halogen-containing polymeric materials. Cable sheathing formed from TPU-based flame retardant (FR) polymer compositions generally fulfill heat deformation testing (UL-1581) requirements at 150° C. that are important in certain W&C applications and which, generally, cannot be achieved with sheathing formed from un-crosslinked polyolefin as a matrix polymer. However, major disadvantages of TPU-based FR compositions is insulation resistance (IR) failure, poor smoke density, high material density, and the high cost of TPU as a raw material.

Using polyolefins to replace TPU could potentially solve problems of TPU-based FR compositions. However, polyolefins or polyolefin elastomer-based HFFR compositions typically suffer from a dramatic drop of heat deformation properties due to a lower melting temperature compared to TPU-based FR compositions, particularly at high temperatures, e.g., 150° C. In addition, the use of polyolefin components typically decrease overall FR performance due to the carbon-hydrogen structure. Consequently, it is difficult for polyolefin-based HFFR compositions to afford a high level of flame retardancy with balanced mechanical properties.

SUMMARY OF THE INVENTION

In embodiments of the invention, a halogen-free, flame retardant composition is provided, which will process easily to make a wire and cable (W&C) sheathing that will pass both the VW-1 flame retardancy test and the UL1581-2001 heat deformation test at 150° C. while at the same time having a secant modulus below 35000 psi, and exhibiting good tensile and flexibility properties, and providing high wet electrical (insulation) resistance. In one embodiment, the composition comprises:

A. A polyolefin base resin based on a propylene polymer, for example, a propylene homopolymer, propylene random copolymer (RCP), a propylene impact modified polymer (ICP), or a mixture thereof, as the primary phase, being at least 5, and more preferred at greater than 10, wt % of the formulation;

B. One or more thermoplastic elastomers (TPE);

C. A flame retardant system based on nitrogen and/or phosphorus-based, intumescent halogen-free flame retardant comprising a piperazine component; and D. Optional additive package.

In embodiments of the composition, the component "A" polyolefin base resin is at least 5 wt % and preferably greater than 10 wt %, the component "B" TPE is at about 1-80, and preferably at least 10, wt %, the component "C" flame retardant system is at least 10, and preferably at least 20, wt %, and the component "D" optional additives, when present, are from 0.1-20 wt %, the wt % based on the total weight of the formulation.

The invention provides a halogen-free, flame-retardant polymer composition for wire and cable (W&C) insulation use, and for replacement of polyvinyl chloride (PVC) compositions innon-PVC, halogen-free and/or halogen-free, flame retardant markets. The present compositions are particularly useful in flexible wiring applications, e.g., consumer electronics such as cell phone charger wire, etc. The compositions of the invention overcome drawbacks of existing technologies y providing the desired balance of mechanical properties, high flame retardancy and processability including good heat stability and high flexibility, and highly improved wet insulation resistance and wet electrical properties, heat aging performance and heat deformation.

The present blends of a polyolefin including propylene and thermoplastic elastomer(s) (TPE) such as random and block-copolymers of polyolefins combined with an intumescent nitrogen-phosphorous (N—P) type, non-halogen, flame-retardant (FR) additive system comprising a piperazine component, achieve an unexpectedly synergy that provides wire and cable (W&C) sheathing made from the FR compositions of the invention with an exceptionally excellent balance of good mechanical properties, including tensile elongations greater than 150% and 200% (ASTM D638), tensile stress greater than 10 MPa, and tensile strengths greater than 800 psi, excellent FR performance to pass the VW-1 test, ease of extrusion, improved heat deformation performance to pass the UL1581-2001 test at up to 150° C. (less than 50%), improved wet electrical resistance, good thermal aging performance, flexibility and low smoke density solution compared to other non-halogen FR composites used for W&C insulation. The PP/TPE compositions of the invention have superior mechanical properties and flexibility compared to TPU-based halogen-free, flame retarding materials and a much lower density and higher wet insulation (electrical) resistance than TPU-based halogen-free, flame retardant (HFFR) compositions, and the raw material cost is significantly decreased. Metal hydrate-based TPU, TPEs or polyolefin compounds, and intumescent-based polyolefin compounds do not provide a proper balance of FR performance and mechanical properties with heat deformation and wet insulation resistance as the present blends of polyolefins such as polypropylene with elastomers or PO-based random or block co-polymers as provided herein. The present compositions pass the criteria for W&C applications, including passing the VW-1 flame retardancy test, measuring a secant modulus (flexibility) at below 35000 psi, and heat deformation at minimum 80° C., and in particular embodiments, at 121° C. and at 150° C., at <50%. The present halogen-free FR thermoplastic compositions also meet North American, European and Japanese specifications including but not limited to UL-62, HD21.14 and JCS 4509 standards and specifications.

Advantageously, the present compositions do not require and, in embodiments, do not include a compatibilizer (e.g., functional polymer) between the PP and thermoplastic elastomer components, which provides a cost effective solution to other compositions and processes that require different functional polymers as compatibilizers to achieve the blends. The inventive compositions also do not employ any crosslinking step (i.e., neither post-curing nor dynamic crosslinking), thus providing a simplified process and improved material processability over other technologies that utilize a crosslinking mechanism. By replacing a portion of the single polymeric content (PP and/or other TPE) of other known formulations with a thermoplastic elastomer (e.g., random or block polyolefin copolymers), the blends in combination with the intumescent nitrogen-phosphorous type FR additive system provide an excellent balance of mechanical properties (e.g., elongations>150%, tensile strengths>800 psi), improved heat deformation temperatures, good burn performance, and improved wet electrical performance. In addition, by blending in low cost polyolefins with the TPE, the cost of the plastic is significantly reduced allowing new formulation latitude for both TPE and polyolefin end uses for halogen-free FR plastics. The compositions of the invention also provide a solution for polyolefin-based HFFR products by affording superior mechanical properties and heat deformation performance while not compromising the overall FR performance.

DETAILED DESCRIPTION OF THE PREFERRED EMBODIMENT

Definitions

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents (%) are based on weight and all test methods are current as of the filing date of this disclosure. For purposes of U.S. patent practice, the contents of any referenced patent, patent application or publication are incorporated by reference in their entirety (or its equivalent U.S. version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amounts of various components in the inventive composition, the amount of the various components in the FR component of the inventive compositions, and the various characteristics and properties by which these compositions and the W&C sheathing made from these compositions are defined.

"Cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Composition", "formulation" and like terms means a mixture or blend of two or more components.

An "elastomer" is a rubber-like polymer which can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72.

"Halogen-free" and like terms mean that the compositions of the invention are without or substantially without halogen content, i.e., contain <2000 mg/kg of halogen as measured by ion chromatography (IC) or similar analytical method. Halogen content of less than this amount is considered inconsequential to the efficacy of the composition as a wire or cable covering.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Intumescent flame retardant" and like terms means a flame retardant that yields a foamed char formed on a surface of a polymeric material during fire exposure.

"Olefin-based polymer" and like terms means a polymer containing, in polymerized form, a majority weight percent (wt %) of an olefin, for example ethylene or propylene, based on the total weight of the polymer. Nonlimiting examples of olefin-based polymers include ethylene-based polymers and propylene-based polymers.

The term "polymer" (and like terms) is a macromolecular compound prepared by reacting (i.e., polymerizing) monomers of the same or different type. "Polymer" includes homopolymers and interpolymers.

"Polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polyolefin", "PO" and like terms mean a polymer derived from simple olefins. Many polyolefins are thermoplastic and for purposes of this invention, can include a rubber phase.

Representative polyolefins include polyethylene, polypropylene, polybutene, polyisoprene and their various interpolymers.

"Resistance" is defined as the opposition of a material to the flow of an electric current based on the shape (area and length) and resistivity of the material. Resistance indicates the degree of electrical continuity across a surface or from surface to ground, and may also indicate the ability of an object to dissipate a charge. The term "surface resistance" is defined as the ratio of dc voltage to the current flowing between two electrodes of a specified configuration that contact the same side of a material. Resistance and surface resistance are expressed in ohms.

"Surface resistivity" is defined as the ratio of the dc voltage drop per unit length to the surface current per unit width for electric current flowing across a surface. Surface resistivity is a material parameter when the material is a thin film of constant thickness. In effect, the surface resistivity is the resistance between two opposite sides of a square, and is independent of the size of the square (where the size is greater than the film thickness) or its dimensional units. Surface resistivity is expressed in ohms per square ($\Omega$/sq) and is traditionally used to evaluate insulative materials for electrical applications.

Tensile elongation at break is measured in accordance with ASTM D638. Tensile strength at break is measured in accordance with ASTM D638.

"Volume resistance" is defined as the ratio of dc voltage to current passing between two electrodes (of a specified configuration) that contact opposite sides of the material of the object under test. Volume resistance is reported in ohms.

"Volume resistivity" is defined as the ratio of the dc voltage drop per unit thickness to the amount of current per unit area passing through the material. Volume resistivity indicates how readily a material conducts electricity through the bulk of the material. Volume resistivity is expressed in ohm-centimeters ($\Omega$-cm).

"VW-1" is an Underwriters' Laboratory (UL) flame rating for wire and sleeving, and denotes "Vertical Wire, Class 1," the highest flame rating a wire or sleeve can be given under the UL 1441 specification. The test is performed by placing the wire or sleeve in a vertical position. A flame is set underneath for a period of time and then removed, and characteristics of the sleeve are noted. The VW-1 flame test can be determined according to Method 1080 of UL-1581.

"Wire" and like terms mean a single strand of conductive metal, e.g., copper or aluminum, or a single strand of optical fiber.

In embodiments of the invention, the compositions comprise a bi-resin system of a component (A) a polyolefin base resin, including but not limited to a polypropylene-based polymer as the primary phase, and a component (B) thermoplastic elastomer(s) (TPE) blended with a component (C) a flame retardant (FR) system and, optionally, a component (D) optional additives. The FR system includes a nitrogen/phosphorus-based, intumescent halogen-free flame retardant comprising a piperazine component (e.g., FP2100J and Budit 3167). The optional additive package can comprise one or more conventional additives for compositions from which flame retardant wire and cable sheaths are prepared, e.g., antioxidants, UV stabilizers, colorants, processing aids, and the like.

Polyolefin (PO) Base Resin/Matrix.

The polyolefin (PO) base resin (matrix) component (A) includes a propylene polymer (also called polypropylene) as the primary phase. The polyolefin base resin component is at least 5, at least 10, and preferably at least 20 wt %, and typically in a range of 5-80, 10-80, 10-40, and preferably 20-40, wt % of the composition.

"Propylene polymer," "propylene" and like terms mean a polymer that comprises a majority wt % polymerized propylene monomer (based on the total amount of polymerizable monomers), and optionally may comprise at least one polymerized comonomer. Propylene polymers of the invention include propylene homopolymers as well as random and impact-modified copolymers of propylene, and mixtures thereof. The propylene polymer can be isotactic, syndiotactic or atactic polypropylene. "Propylene homopolymer" and similar terms mean a polymer consisting solely or essentially all of units derived from a propylene monomer at greater than 65 wt %. "Propylene copolymer" and similar terms mean a polymer comprising units derived from propylene and ethylene and/or one or more unsaturated comonomers. The term "copolymer" includes terpolymers, tetrapolymers, etc. For propylene copolymers, the comonomer content is preferably less than 35, preferably 2 to 30, and preferably 5 to 20, wt %. The melt flow rate (MFR, as measured by ASTM D1238 at 230° C./2.16 kg) of the propylene polymers is preferably less than 20 g/10 min., and preferably at least 1, 1.5, and most preferably at least 1.9, g/10 min., and typically up to 2, 5, 7, most preferably up to 12, g/10 min., in order to achieve good processability and mechanical properties balance. The propylene polymer preferably exhibits a peak melting point ($T_{max}$), as determined by DSC, of 100-170° C., and preferably higher than 140° C. Polypropylene homopolymers are commercially available and include DOW polypropylene homopolymer resins DOW 5D49 (MFR=38 g/10 min), DOW 5D98 (MFR=3.4 g/10 min), DOW 5E16S (MFR=35 g/10 min), and DOW 5E89 (MFR=4.0 g/10 min), among others, all available from The Dow Chemical Company.

Propylene homopolymers are a readily available and competitively priced material. However, random and impact copolymers are preferred for compatibility of propylene and ethylene polymers, and improved physical and mechanical properties for the resulting articles (such as improved tear, dart impact, or puncture resistance in films). In comparison with propylene homopolymers, random propylene copolymers exhibit improved optical properties (i.e., clarity and haze), improved impact resistance, increased flexibility and a decreased melting point. Random propylene copolymers are used in many applications, typically those that require improved clarity and/or impact resistance (as compared to propylene homopolymers).

"Random copolymer" means a copolymer in which the monomer is randomly distributed across the polymer chain. Random propylene copolymers typically comprise 90 or more mole % units derived from propylene, with the remainder of the units derived from units of at least one $\alpha$-olefin. The presence of the comonomer in the copolymer changes the crystallinity, and thus the physical properties, of the propylene. The $\alpha$-olefin component of the random propylene copolymer is preferably ethylene (considered an $\alpha$-olefin for purposes of this invention) or a $C_{4-20}$ linear, branched or cyclic $\alpha$-olefin. Examples of $C_{4-20}$ $\alpha$-olefins include 1-butene, 4-methyl-1-pentene, 1-hexene, 1-octene, 1-decene, 1-dodecene, 1-tetradecene, 1-hexadecene, and 1-octadecene. The $\alpha$-olefins also can contain a cyclic structure such as cyclohexane or cyclopentane, resulting in an $\alpha$-olefin such as 3-cyclohexyl-1-propene (allyl cyclohexane) and vinyl cyclohexane. Although not $\alpha$-olefins in the classical sense of the term, for purposes of this invention certain cyclic olefins, such as norbornene and related olefins, particularly 5-ethylidene-2-norbornene, are $\alpha$-olefins and can be used in place of some or all of the $\alpha$-olefins described above. Similarly, styrene and its related olefins (e.g., α-methylstyrene, etc.) are α-olefins for purposes of this invention. Illustrative random polypropylene copolymers include but are not limited to propylene/ethylene, propylene/1-butene, propylene/1-hexene, propylene/1-octene, and the like. Random copolymer polypropylenes are commercially available and include DOW random copolymer polypropylene resins DS6D82 (MFR=7.0 g/10 min), 6D83K (MFR=1.9 g/10 min), C715-12NHP (MFR=12 g/10 min), among others, all available from The Dow Chemical Company.

The term "impact copolymer" refers to heterophasic propylene copolymers where polypropylene is the continuous phase (matrix) and an elastomeric phase is uniformly dispersed therein. Impact copolymers are a physical blend of homopolymer with an elastomer, and can be produced by mechanical blending or through the use of multi-stage reactors. Usually the impact copolymers are formed in a dual or multi-stage process. In some embodiments, the impact copolymers have at least 5, at least 6, and preferably at least 7, up to 35, up to 15, and preferably up to 9, wt % ethylene comonomer. Illustrative impact-modified propylene copolymers include those commercially available from The Dow Chemical Company under the trade designations C766-03 (MFR=3 g/10 min), C7057-07 (MFR=7 g/10 min), C7061-01N (MFR=1.5 g/10 min), C706-21NA HP (MFR=21 g/10 min).

Thermoplastic Elastomer (TPE).

The component "B" thermoplastic elastomer (TPE) is a polyolefin (PO) that (1) has the properties of an elastomer with the ability to be stretched beyond its original length and retract to substantially its original length when released, and (2) can be processed like a thermoplastic with the ability to soften when exposed to heat and return to substantially its original condition when cooled to room temperature. A TPE contains at least two segments, one thermoplastic and the other elastomeric.

The composition can be formulated with one or more TPE resins to enhance the overall property balance of the composition, which can be present as a dispersed phase within the polyolefin (PO) base resin (matrix), or as a co-continuous phase interspersed with the PO phase, or a TPE as a co-continuous phase with PP and one or more other TPEs dispersed therein. The TPE(s) can be included at 5 to 80, preferably 10 to 50, 10 to 40, and preferably at 20 to 40, wt % of the composition. Preferred TPEs have melting temperature (DSC Tm peak) of 50-130° C. Nonlimiting examples of suitable TPEs according to the invention include styrenic block copolymers (e.g., SEBS), propylene-based elastomers/plastomers (e.g., VERSIFY™ propylene-ethylene copolymers) and olefin block copolymers (OBCs) (e.g., INFUSE™ 9507 or 9100 OBC).

In general, styrenic block copolymers suitable for the invention include at least two monoalkenyl arene blocks, preferably two polystyrene blocks, separated by a block of saturated conjugated diene, preferably a saturated polybutadiene block. The preferred styrenic block copolymers have a linear structure, although in some embodiments, branched or radial polymers or functionalized block copolymers make useful compounds. The total number average molecular weight of the styrenic block copolymer is preferably from 30,000 to 250,000 if the copolymer has a linear structure. Such block copolymers typically have an average polystyrene content from 6 to 65, more typically from 10 to 40 wt % of the copolymer. Examples of styrenic block copolymers suitable for the invention are described in EP0712892, WO 2004/041538, U.S. Pat. Nos. 6,582,829, 4,789,699, 5,093,422 and 5,332,613, and US 2004/0087235, 2004/0122408, 2004/0122409, and 2006/0211819. Nonlimiting examples of suitable styrenic block copolymers include styrene/butadiene (SB) copolymers, styrene/ethylene/butadiene/styrene (SEBS) terpolymers, styrene/butadiene/styrene (SBS) terpolymers, hydrogenated SBS or SEBS, styrene/isoprene (SI), and styrene/ethylene/propylene/styrene (SEPS) terpolymers. Commercial sources of styrenic block copolymers include Kraton Polymers (SEBS G1643M, G1651ES), Asahi Kasei Chemicals Corporation, and Kuraray America.

The terms "polypropylene-based plastomers" (PBP) or "propylene-based elastomers" (PBE) include reactor grade propylene/α-olefins copolymers having a heat of fusion <100 J/g and MWD<3.5. The PBPs generally have a heat of fusion <100 J/g while the PBEs generally have a heat of fusion <40 J/g. The PBPs typically have a wt % ethylene in the range of 3 to 15 wt %, with the elastomeric PBEs being of 10 to 15 wt % ethylene.

In selected embodiments, the TPE polymer is formed from ethylene/α-olefin copolymers or propylene/α-olefin copolymers. In one embodiment, the TPE polymer comprises one or more non-polar polyolefins. In one particular embodiment, the TPE polymer is a propylene/α-olefin copolymer, characterized as having substantially isotactic propylene sequences. "Substantially isotactic propylene sequences" means the sequences have an isotactic triad (mm) measured by $^{13}$C NMR of >0.85, >0.90, >0.92, and, in another alternative, >0.93. Isotactic triads are known in the art and described in, for example, U.S. Pat. No. 5,504,172 and WO 2000/01745, which refer to the isotactic sequence in terms of a triad unit in the copolymer molecular chain determined by $^{13}$C NMR spectra.

The propylene/α-olefin copolymer may have a melt flow rate (MFR) in the range of from 0.1 to 25 g/10 min., measured in accordance with ASTM D-1238 (at 230° C./2.16 Kg). All individual values and subranges from 0.1 to 25 g/10 min. are included and disclosed herein; for example, the MFR can be from a lower limit of 0.1, 0.2, or 0.5, to an upper limit of 25, 15, 10, 8, or 5, g/10 min. For example, the propylene/α-olefin copolymer may have a MFR in the range of 0.1 to 10, or in the alternative, 0.2 to 10, g/10 min.

The propylene/α-olefin copolymer has a crystallinity in the range of from at least 1 to 30 wt % (a heat of fusion of at least 2 to less than 50 Joules/gram (J/g)), all individual values and subranges thereof being included and disclosed herein. For example, the crystallinity can be from a lower limit of 1, 2.5, or 3, wt % (respectively, at least 2, 4, or 5 J/g) to an upper limit of 30, 24, 15 or 7, wt % (respectively, less than 50, 40, 24.8 or 11 J/g). For example, the propylene/α-olefin copolymer may have a crystallinity in the range of from at least 1 to 24, 15, 7, or 5, wt % (respectively, at least 2 to less than 40, 24.8, 11, or 8.3 J/g). Crystallinity is measured via DSC method, as described above. The propylene/α-olefin copolymer comprises units derived from propylene and polymeric units derived from one or more α-olefin comonomers. Exemplary comonomers are $C_2$, and $C_4$ to $C_{10}$ α-olefins; for example, $C_2$, $C_4$, $C_6$ and $C_8$ α-olefins.

The propylene/α-olefin copolymer comprises from 1 to 40 wt % of one or more alpha-olefin comonomers. All individual values and subranges from 1 to 40 wt % are included and disclosed herein; for example, the comonomer content can be from a lower limit of 1, 3, 4, 5, 7 or 9, wt % to an upper limit of 40, 35, 30, 27, 20, 15, 12 or 9, wt %. For example, the propylene/α-olefin copolymer comprises from 1 to 35 wt %, or, in alternatives, from 1 to 30, 3 to 27, 3 to 20, or from 3 to 15, wt %, of one or more α-olefin comonomers.

The propylene/α-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/α-olefin copolymers are further described in details in U.S. Pat. Nos. 6,960,635 and 6,525,157, incorporated herein by reference. Such propylene/α-olefin copolymers are commercially available from The Dow Chemical Company, under the tradename VERSIFY, or from Exxon-Mobil Chemical Company, under the tradename VISTAMAXX.

In one embodiment, the propylene/α-olefin copolymers are further characterized as comprising (A) between 60 and less than 100, between 80 and 99, and more preferably between 85 and 99, wt % units derived from propylene, and (B) between greater than zero and 40, preferably between 1 and 20, 4 and 16, and even more preferably between 4 and 15, wt % units derived from at least one of ethylene and/or a $C_{4-10}$ α-olefin; and containing an average of at least 0.001, at least 0.005 and more preferably at least 0.01, long chain branches/1000 total carbons, wherein the term long chain branch refers to a chain length of at least one (1) carbon more than a short chain branch, and wherein short chain branch refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches in the propylene interpolymer is not critical to the definition of this embodiment of the instant invention, but typically it does not exceed 3 long chain branches/1000 total carbons. Such propylene/α-olefin copolymers are further described in U.S. Provisional 60/988,999 and PCT/US08/082,599, incorporated herein by reference.

"Olefin block copolymers," "olefin block interpolymers," "multi-block interpolymers" and like terms refer to a polymer comprising two or more chemically distinct regions or segments (referred to as "blocks") preferably joined in a linear manner, that is, a polymer comprising chemically differentiated units which are joined end-to-end with respect to polymerized olefinic, preferable ethylenic, functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the multi-block interpolymers used in this invention are characterized by unique distributions of both polymer polydispersity (PDI or $M_w/M_n$ or MWD), block length distribution, and/or block number distribution, due, in a preferred embodiment, to the effect of the shuttling agent(s) in combination with multiple catalysts used in their preparation. More specifically, when produced in a continuous process, the polymers desirably possess a PDI from 1.7 to 3.5, preferably 1.8 to 3, from 1.8 to 2.5, and most preferably from 1.8 to 2.2. When produced in a batch or semi-batch process, the polymers desirably possess a PDI from 1.0 to 3.5, preferably from 1.3 to 3, from 1.4 to 2.5, and most preferably from 1.4 to 2.

The term "ethylene multi-block interpolymers" means a multi-block interpolymers comprising ethylene and one or more interpolymerizable comonomers, in which ethylene comprises a plurality of the polymerized monomer units of at least one block or segment in the polymer, preferably at least 90, at least 95 and most preferably at least 98, mole % of the block. Based on total polymer weight, the ethylene multi-block interpolymers used in the practice of the present invention preferably have an ethylene content of 25 to 97, of 40 to 96, of 55 to 95, and most preferably of 65 to 85, %.

Because the respective distinguishable segments or blocks formed from two of more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In a preferred embodiment the quantity of extractable polymer using either a dialkyl ether or an alkane-solvent is <10, <7, <5 and most preferably <2, % of the total polymer weight.

In addition, the multi-block interpolymers used in the practice of the invention desirably possess a PDI fitting a Schutz-Flory distribution rather than a Poisson distribution. The use of the polymerization process described in WO 2005/090427 and U.S. Ser. No. 11/376,835 results in a product having both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In a further embodiment, the multi-block interpolymers, especially those made in a continuous, solution polymerization reactor, possess a most probable distribution of block lengths. In an embodiment of this invention, the ethylene multi-block interpolymers are defined as having:

(A) $M_w/M_n$ from about 1.7 to about 3.5, at least one melting point, $T_m$, in degrees Celsius, and a density, d, in grams/cubic centimeter, where in the numerical values of $T_m$ and d correspond to the relationship: $T_m > -2002.9 + 4538.5(d) - 2422.2(d)^2$, or (B) $M_w/M_n$ from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships: ΔT>−0.1299 (ΔH)+62.81 for ΔH greater than zero and up to 130 J/g, and ΔT≥48 C for ΔH greater than 130 J/g, wherein the CRYSTAF peak is determined using at least 5% of the cumulative polymer, and if less than 5% of the polymer has an identifiable CRYSTAF peak, then the CRYSTAF temperature is 30° C.; or (C) Elastic recovery, Re, in % at 300% strain and 1 cycle measured with a compression-molded film of the ethylene/α-olefin interpolymer, and has a density, d, in g/cc, wherein the numerical values of Re and d satisfy the following relationship when ethylene/α-olefin interpolymer is substantially free of crosslinked phase: Re>1481−1629(d); or (D) A molecular weight fraction which elutes between 40° C. and 130° C. when fractionated using TREF, characterized in that the fraction has a molar comonomer content of at least 5% higher than that of a comparable random ethylene interpolymer fraction eluting between the same temperatures, wherein said comparable random ethylene interpolymer has the same comonomer(s) and has a melt index, density and molar comonomer content (based on the whole polymer) within 10% of that of the ethylene/α-olefin interpolymer; or (E) A storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block interpolymer may also have:

(F) A molecular fraction which elutes between 40° C. and 130° C. when fractionated using TREF, characterized in that the fraction has a block index of at least 0.5 and up to about 1 and a molecular weight distribution, $M_w/M_n$ greater than about 1.3; or (G) An average block index greater than zero and up to about 1.0 and a molecular weight distribution, $M_w/M_n$ greater than about 1.3.

Suitable monomers for use in preparing the ethylene multi-block interpolymers used in this invention include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

Other ethylene multi-block interpolymers that can be used in this invention are elastomeric interpolymers of ethylene, a $C_{3-20}$ α-olefin, especially propylene, and, optionally, one or more diene monomers. Preferred α-olefins for use in this embodiment are designated by the formula $CH_2=CHR^*$, where R* is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. One particularly preferred α-olefin is propylene. The propylene based polymers are generally referred to in the art as EP or EPDM polymers. Suitable dienes for use in preparing such polymers, especially multi-block EPDM type-polymers include conjugated or non-conjugated, straight or branched chain-, cyclic- or polycyclic dienes containing from 4 to 20 carbon atoms. Preferred dienes include 1,4-pentadiene, 1,4-hexadiene, 5-ethylidene-2-norbornene, dicyclopentadiene, cyclohexadiene, and 5-butylidene-2-norbornene. One particularly preferred diene is 5-ethylidene-2-norbornene.

Because the diene containing polymers contain alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

The ethylene multi-block interpolymers useful in the practice of this invention have a density of less than 0.90, preferably less than 0.89, less than 0.885, less than 0.88 and even more preferably less than 0.875, g/cc. The ethylene multi-block interpolymers typically have a density greater than 0.85, and more preferably greater than 0.86, g/cc. Density is measured by the procedure of ASTM D-792. Low density ethylene multi-block interpolymers are generally characterized as amorphous, flexible and having good optical properties, e.g., high transmission of visible and UV-light and low haze. The ethylene multi-block interpolymers useful in this invention typically have a MFR of 1-10 g/10 min. as measured by ASTM D1238 (190° C./2.16 kg). The ethylene multi-block interpolymers useful in the practice of this invention have a 2% secant modulus of <150, preferably <140, <120 and even more preferably <100, mPa as measured by the procedure of ASTM D-882-02. The ethylene multi-block interpolymers typically have a 2% secant modulus of greater than zero, but the lower the modulus the better the interpolymer is adapted for use in this invention. The secant modulus is the slope of a line from the origin of a stress-strain diagram and intersecting the curve at a point of interest, and it is used to describe the stiffness of a material in the inelastic region of the diagram. Low modulus ethylene multi-block interpolymers are particularly well adapted for use in this invention because they provide stability under stress, e.g., less prone to crack upon stress or shrinkage. The ethylene multi-block interpolymers useful in this invention typically have a melting point of less than about 125° C. The melting point is measured by the differential scanning calorimetry (DSC) method described in WO 2005/090427 (US 2006/0199930). Ethylene multi-block interpolymers with a low melting point often exhibit desirable flexibility and thermoplasticity properties useful in the fabrication of the wire and cable sheathings of this invention. The ethylene multi-block interpolymers used in the practice of this invention, and their preparation and use, are more fully described in U.S. Pat. Nos. 7,579,408, 7,355,089, 7,524,911, 7,514,517, 7,582,716 and 7,504,347.

Olefinic block copolymers useful in the practice of this invention include INFUSE® OBCs, available from The Dow Chemical Company), e.g., INFUSE OBC D9100 (1MI, 0.877, 74A Shore), D9500 (5MI, 0.877, 74A Shore), D9507 or D9530 (5MI, 0.887, 85A Shore).

Other TPE Polymers.

Other TPE polymers include, for example, but are not limited to, thermoplastic urethane (TPU), ethylene/vinyl acetate (EVA) copolymers (e.g., Elvax 40L-03 (40% VA, 3MI) (DuPont)), ethylene/ethyl acrylate (EEA) copolymers (e.g., AMPLIFY) and ethylene acrylic acid (EAA) copolymers (e.g., PRIMACOR) (The Dow Chemical Company), polyvinylchloride (PVC), epoxy resins, styrene acrylonitrile (SAN) rubber, and Noryl® modified PPE resin (amorphous blend of polyphenylene oxide (PPO) and polystyrene (PS) by SABIC), among others. Also useful are olefinic elastomers including, for example, very low density polyethylene (VLDPE) (e.g., FLEXOMER® ethylene/1-hexene polyethylene, The Dow Chemical Company), homogeneously branched, linear ethylene/α-olefin copolymers (e.g. TAFMER® by Mitsui Petrochemicals Company Limited and EXACT® by DEXPlastomers), and homogeneously branched, substantially linear ethylene/α-olefin polymers (e.g., AFFINITY® ethylene-octene plastomers (e.g., EG8200 (PE)) and ENGAGES polyolefin elastomers, The Dow Chemical Company). Substantially linear ethylene copolymers are more fully described in U.S. Pat. Nos. 5,272,236, 5,278,272 and 5,986,028. Additional olefinic interpolymers useful in the present invention include heterogeneously branched ethylene-based interpolymers including, but are not limited to, linear medium density polyethylene (LMDPE), linear low density polyethylene (LLDPE), and ultra low density polyethylene (ULDPE). Commercial polymers include DOWLEX™ polymers, ATTANE™ polymer, FLEXOMER™, HPDE 3364 and HPDE 8007 polymers (The Dow Chemical Company), ESCORENE™ and EXCEED™ polymers (Exxon Mobil Chemical). Nonlimiting examples of suitable TPUs include PELLETHANE™ elastomers (Lubrizol Corp. (e.g., TPU 2103-90A); ESTANE™, TECOFLEX™, CARBOTHANE™, TECOPHILIC™, TECOPLAST™ and TECOTHANE™ (Noveon); ELASTOLLAN™, etc. (BASF), and commercial TPUs available from Bayer, Huntsman, the Lubrizol Corporation and Merquinsa.

The ethylene interpolymers useful in the present invention include ethylene/α-olefin interpolymers having a α-olefin content typically of at least 5, more typically at least 15 and even more typically of at least about 20, wt % based on the weight of the interpolymer. These interpolymers typically have an α-olefin content of <90, more typically <75 and even more typically <50, wt % based on the weight of the interpolymer. The α-olefin content is measured by $^{13}C$ nuclear magnetic resonance (NMR) spectroscopy using the procedure described in Randall (*Rev. Macromol. Chem. Phys.*, C29 (2&3)). The α-olefin is preferably a $C_{3-20}$ linear, branched or cyclic α-olefin, for example, propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative polyolefin copolymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

Flame Retardant (FR) System.

The component "C" flame retardant (FR) system used in the practice of this invention comprises one or more organic phosphorus-based and/or nitrogen-based intumescent FR, including a piperazine component. The preferred amount of the nitrogen/phosphorus-based FR used in the compositions of this invention is at least 1, 10, 15, and most preferably at least 20 wt %, based on the weight of the composition. The typical maximum amount of the organic nitrogen/phosphorus-based FR does not exceed 70, 60, 50, and more preferably does not exceed 45, wt % of the composition. The FR system can comprise 1-99 wt % piperazine based FR and 1-99 wt % other flame retardant, based on the total weight of the FR system. The preferred amount of the piperazine based FR is at least 5, 10, 20, 30, 40, and at least 50, wt %. In particular embodiments, the FR system can comprise 55-65 wt % piperazine based FR and 35-45 wt % other flame retardant (e.g., non-metal salts of phosphoric acid).

Organic nitrogen and/or phosphorus-based intumescent FRs include, but are not limited to, organic phosphonic acids, phosphonates, phosphinates, phosphonites, phosphinites, phosphine oxides, phosphines, phosphites or phosphates, phosphonitrilic chloride, phosphorus ester amides, phosphoric acid amides, phosphonic acid amides, phosphinic acid amides, and melamine and melamine derivatives, including melamine polyphosphate, melamine pyrophosphate and melamine cyanurate, and mixtures of two or more of these materials. Examples include phenylbisdodecyl phosphate, phenylbisneopentyl phosphate, phenyl ethylene hydrogen phosphate, phenyl-bis-3,5,5'-trimethylhexyl phosphate), ethyldiphenyl phosphate, 2-ethylhexyl di(p-tolyl)phosphate, diphenyl hydrogen phosphate, bis(2-ethyl-hexyl) p-tolylphosphate, tritolyl phosphate, bis(2-ethylhexyl)-phenyl phosphate, tri(nonylphenyl)phosphate, phenylmethyl hydrogen phosphate, di(dodecyl) p-tolyl phosphate, tricresyl phosphate, triphenyl phosphate, triphenyl phosphate, dibutylphenyl phosphate, 2-chloroethyldiphenyl phosphate, p-tolyl bis(2,5,5'-trimethylhexyl)phosphate, 2-ethylhexyldiphenyl phosphate, and diphenyl hydrogen phosphate. Phosphoric acid esters of the type described in U.S. Pat. No. 6,404,971 are examples of phosphorus-based FRs. Additional examples include liquid phosphates such as bisphenol A diphosphate (BAPP) (Adeka Palmarole) and/or resorcinol bis(diphenyl phosphate) (Fyroflex RDP) (Supresta, ICI), and solid phosphorus such as ammonium polyphosphate (APP), piperazine pyrophosphate, piperazine orthophosphate and piperazine polyphosphate. APP is often used with flame retardant co-additives, such as melamine derivatives. Also useful is Melafine (DSM) (2,4,6-triamino-1,3,5-triazine; fine grind melamine).

Examples of piperazine components of the FR system include compounds such as piperazine pyrophosphate, piperazine orthophosphate and piperazine polyphosphate. Additional examples include polytriazinyl compounds or oligomer or polymer 1,3,5-triazine derivatives including a piperazine group, as described in US 2009/0281215 and WO 2009/016129, the disclosures of which are incorporated by reference herein.

Embodiments of the FR system comprise one or more non-metal salts of phosphoric acid, for example but not limited to, APP, melamine and/or a melamine derivative such as melamine pyrophosphate and melamine polyphosphate, and one or more piperazine components, for example but not limited to, a piperazine compound such as piperazine pyrophosphate, piperazine orthophosphate, piperazine polyphosphate, a polytriazinyl compound comprising a piperazine group, etc., and/or a oligomer or polymer 1,3,5-triazine derivative comprising a piperazine group. In particular embodiments, the FR system is a blend of APP, melamine and/or a melamine derivative, and a piperazine compound such as piperazine pyrophosphate, piperazine orthophosphate, and/or piperazine polyphosphate. In another embodiment, the FR system is a blend of APP, melamine and/or a melamine derivative and an oligomer or polymer 1,3,5-triazine derivative comprising a piperazine group. In some embodiments, the FR material comprises a melamine-based coating. Such organic nitrogen/phosphorus-based intumescent material blends are commercially available as FP-2200 and FP-2100J, intumescent flame retardants from Amfine Chemical Corporation (USA) (Adeka Palmarole SAS), and as Budit 3167 available from Budenheim Ibérica Comercial, S.A (Spain).

The PP/TPE/intumescent FR blends of this invention, in particular blends with FP2100J and/or Budit 3167 as a primary FR chemical, exhibit excellent burn performance and resulted in a synergistic balance of superior flame retardancy sufficient to pass the VW-1 testing requirements (UL 1581) and tensile properties including a tensile stress larger than 8

MegaPascals (MPa) and a tensile elongation larger than 200% (ASTM D638), a heat deformation ratio<50% at 150° C. (UL1581-2001), and good flexibility and softness (2% Secant modulus <250 MPa (ASTM D638); Shore A hardness of <95 (ASTM D2240).

Optional Additive Package.

Component "D" additional additives can be included in a range of 0.1 to 20 wt % of the composition. The PP/TPE/FR compositions can incorporate one or more stabilizers and/or additives found useful for PP/TPE applications such as, but not limited to, antioxidants (e.g., hindered phenols such as IRGANOX™ 1010 (Ciba/BASF)), thermal (melt processing) stabilizers, hydrolytic stability enhancers, heat stabilizers, acid scavengers, colorants or pigments, UV stabilizers, UV absorbers, nucleating agents, processing aids (such as oils, organic acids such as stearic acid, metal salts of organic acids), antistatic agents, smoke suppressants, anti-dripping agents, tougheners, plasticizers (such as dioctylphthalate or epoxidized soy bean oil), lubricants, emulsifiers, optical brighteners, coupling agents, silanes (in free form or as filler surface modifier), cement, urea, polyalcohols like pentaerythritol, minerals, peroxides, light stabilizers (such as hindered amines), mold release agents, waxes (such as polyethylene waxes), viscosity modifiers, and other additives, to the extent that these additives do not interfere with the desired physical or mechanical properties of the articles made from the compositions of the present invention. These additives are used in known amounts and in known ways, but typically the additive package comprises, if present at all, greater than zero, e.g., 0.01, to 2, more typically 0.1 to 1, wt % of the final composition. Examples of useful viscosity modifiers include polyether polyols such as Voranol 3010 and Voranol 222-029, available from The Dow Chemical Company). Useful commercially available anti-dripping agents include triglycidyl isocyanurate (TGIC), VIKOFLEX 7010 (methyl epoxy soyate (epoxidized ester family)), and VIKOLOX alpha olefin epoxy (C-16) (mixture of 1,2-epoxyhexadecane (>95 wt %) and 1-hexadecene (<5 wt %), both available from eFAME. A useful dispersant/metal chelater is n-octylphosphonic Acid (UNIPLEX OPA).

In preferred embodiments, the compositions of the invention do not include a functionalized compatibilizer or modifier such as a maleic acid anhydride olefin-based polymer or polyolefin (e.g., PE-g-MAH, MAH-g-EVA, etc). The present compositions can include a compatibilizer/coupling agent such as ethylene vinyl acetate (EVA) copolymer (e.g., ELVAX 40L-03 (40% VA, 3MI) by DuPont), aminated OBCs (e.g., INFUSE 9807 by The Dow Chemical Company). Examples of other coupling agents include polysiloxane containing vinyl and ethoxy groups (e.g., Dynasylan 6498 (oligomeric vinyl silane)) and hydroxy-terminated dimethylsiloxane (<0.1 vinyl acetate).

In some applications, the FR system can optionally include minor amounts (less than 5, preferably less than 2, wt % of the composition) of inorganic, non-halogenated flame retardants (fillers) and synergists in combination with the FR system. Inorganic, non-halogenated FR fillers include, for example, metal hydrates such as aluminum hydrate and magnesium hydrate, metal hydroxides such as magnesium hydroxide (Mg(OH)$_2$) and aluminum trihydroxide (ATH) (e.g., Apyral 40CD (Nabeltec)) metal oxides such as titanium dioxide, silica, alumina, huntite, antimony trioxide, potassium oxide, zirconium oxide, zinc oxide and magnesium oxide, carbon black, carbon fibers, expanded graphite, talc, clay, organo-modified clay, calcium carbonate, red phosphorous, wollastonite, mica, ammonium octamolybdate, frits, hollow glass microspheres, glass fibers, expanded graphite and the like.

In preferred embodiments, the compositions of the invention do not include silicone oil (polydimethylsiloxane), although in certain applications, a minor amount (<5, preferably <2, wt % of the composition) of silicone oil can be included as a process aid and flame retardant booster. In preferred embodiments, the compositions of the invention are not blended or diluted with other polymers such as polyolefin-rubber elastomers, olefine-octene or olefin-alkyl acrylate copolymer-based elastomers, functionalized polymers (e.g., containing a carboxylic acid or acid anhydride group), anhydride-modified olefin-based polymers/polyolefins, or polyolefin elastomers grafted with polar groups. However, in some embodiments, the propylene and TPE can be blended or diluted with one or more other polymers to adjust property and extrusion performance balance, to the extent that, in a preferred mode, the propylene component "A" constitutes at least 5, at least 10, and more preferably at least 20, and the TPE component "B" constitutes at least 5, at least 10, and more preferably at least 20, wt % of the composition.

Relative Amounts of PP, TPE and FR.

The propylene polymer (PP) and thermoplastic elastomer (TPE) are blended with one another in any convenient manner to form a polymer matrix, for example, PP as a continuous phase and the TPE component as a discontinuous or dispersed phase, or PP with one or more TPEs as a co-continuous phase and one or more other TPEs as a discontinuous or dispersed phase. Blends of any of the propylenes or TPEs can be used in this invention. The relative amounts of propylene polymer (PP), TPE and FR in the composition can vary widely, but typically, the PP comprises 5 to 60, 7.5 to 40, and more typically 10 to 40, and the TPE comprises 5 to 60, 10 to 55, and more typically 20 to 50, and the FR comprises 10 to 70, 15 to 50, and more typically 20 to 45, wt % of the composition.

The compositions of the invention combine PP, TPE (e.g., styrenic block copolymers, olefin-based TPEs, OBCs, etc.) and an intumescent N—P flame retardant (FR) system comprising a piperazine component (e.g., Adeka FP2100J), to formulate an HFFR package. In embodiments, the invention provides a PP/TPE-based HFFR that utilizes a polyolefin or thermoplastic elastomer alone and, surprisingly this combination together with the described organic N—P based intumescent FR system, in particular FP2100J and/or Budit 3167, comprising a piperazine component, exhibits a burn synergistic effect, exceptional flame retardancy, and at the same time, affords good mechanical properties and excellent heat deformation performance as high as 150° C. In a particular embodiment, the composition comprises a HFFR blend of PP with a TPE such as VERSIFY polypropylene/ethylene copolymer and an N—P-based intumescent FR system comprising a piperazine component (e.g., FP2100J or Budit 3167) for W&C applications.

Compounding/Fabrication.

Compounding of the compositions of this invention can be performed by standard means known to those skilled in the art. Examples of compounding equipment are internal batch mixers, e.g., Banbury or Bolling internal mixer. Alternatively, continuous single or twin screw mixers can be used, e.g., Farrel continuous mixer, Werner and Pfleiderer twin screw mixer, or Buss kneading continuous extruder. The type of mixer utilized, and the operating conditions of the mixer, will affect properties of the composition such as viscosity, volume resistivity, and extruded surface smoothness. The compounding temperature of the PP/TPE polymer blend with the FR and optional additive packages is typically from 120 to 220° C., more typically from 160 to 200° C. The various components of the final composition can be added to and compounded with one another in any order, or simultaneously, but typically a compatibilizers (if included) is first compounded with the PP and the TPE is first compounded with one or more of the components of the FR package, and the two mixtures with any remaining components of the FR package and any additives are compounded with one another. In some embodiments, the additives are added as a pre-mixed masterbatch, which are commonly formed by dispersing the additives, either separately or together, into an inert plastic resin, e.g., one of the plastic matrix components or a low density polyethylene. Masterbatches are conveniently formed by melt compounding methods.

Articles of Manufacture.

In particular embodiments, the polymer composition can be applied as a covering to a cable, e.g., a sheath, jacket or insulation layer, in known amounts and by known methods (e.g., with equipment and methods described in U.S. Pat. Nos. 5,246,783 and 4,144,202). Typically, the composition is prepared in a reactor-extruder equipped with a cable-coating die and after the components are formulated, the composition is extruded over the cable as the cable is drawn through the die. The sheath is then typically subjected to a cure period at temperatures from ambient up to but below the melting point of the composition until the article has reached the desired degree of crosslinking. Cure may begin in the reactor-extruder.

The compositions of the invention can be used in a broad range of non-halogen or halogen-free FR applications requiring high flame retardancy and good flexibility, PVC replacement use, etc. for both W&C and other market segments, and are particularly well suited for applications requiring high flexibility and/or high burn resistance, in combination with good wet insulation resistance. Non-limiting examples of articles of manufacture that can be prepared from the compositions of this invention include AC plug and SR connectors, wire insulations/cable jackets, watch straps, handles, grips, soft touch articles and buttons, weather-stripping, automotive applications including glass run channel seals, interior panels, seals, gaskets, window seals and extruded profiles, consumer electronic applications, and low voltage applications, among others. These articles can be manufactured using known equipment and techniques.

The invention is described more fully through the following examples. Unless otherwise noted, all parts and percentages are by weight.

Specific Embodiments

Materials.

The following materials are used in the following examples. The materials are dried or otherwise treated, if at all, as described. MFR at dg/min (ASTM D-1238; 2.16 kg @ 230° C. unless designated otherwise). Density (d) at g/cm$^3$ (ASTM D-792).

| | |
|---|---|
| PP (6D83K)[1] | polypropylene random copolymer (MFR = 1.9) |
| PP (C715-12)[1] | polypropylene random copolymer (MFR = 12) |
| DOW DS6D82[1] | random polypropylene (MFR = 7) |
| INSPIRE 117[1] | polypropylene impact copolymer (MFR = 2.1) |
| SEBS (G1643M)[2] | styrene-ethylene-butylene-styrene (MFR = 18 (5 kg @ 200° C.); d = 0.9) |
| VERSIFY[1] | propylene-ethylene copolymer |
| | VERSIFY 2300 (MFR = 2; d = 0.866)  VERSIFY 3300 (MFR = 2; d = 0.888) |
| | VERSIFY 2400 (MFR = 2; d = 0.858)  VERSIFY 4200 (MFR = 25; d = 0.876) |
| | VERSIFY 3000 (MFR = 8; d = 0.888)  VERSIFY 4301 (MFR = 25; d = 0.867) |
| | VERSIFY 3200 (MFR = 8; d = 0.876) |
| INFUSE D9530 | OBC (MFR = 5 (2.16 kg @ 190° C.); d = 0.887, 74A Shore). Before use, samples dried at 47° C. for at least 6 hrs under vacuum. |
| FP-2100J[3] | N/P-based intumescent FR with piperazine pyrophosphate |
| FR CROS C30[4] | intumescent FR (coated APP (>98 wt %) and melamine (<2 wt %) |
| Budit 311[4] | di-melamine pyrophosphate (MPP) intumescent FR |
| Budit 3141[4] | melamine polyphosphate (MPP) intumescent FR |
| Budit 3167[5] | intumescent FR filler (APP/piperazine component/melamine coating |
| Reofos BAPP[5] | intumescent FR fluid (phosphoric trichloride reaction product with bisphenol A and phenol + triphenyl phosphate |
| DC-200 Fluid 60M[6] | silicone oil (60K cSt)-polydimethylsiloxane process aid/FR booster |
| Irganox 1010[7] | phenolic based anti-oxidant (tetrakis(methylene(3,5-di-t-butyl-4-hydroxy hydrocinnamate))methane. |

[1]The Dow Chemical Company
[2]Kraton
[3]Adeka Palmarole
[4]Budenheim
[5]Chemtura Corporation
[6]Dow Corning Corp.
[7]Ciba/BASF Melt Mixing/Melt Compounding.

Resin batches were prepared using a CW Brabender model Prep-Mixer®/Measuring Head laboratory electric batch mixer equipped with Cam Blades, a large mixer/measuring head, 3-piece design with two heating zones and 350/420 ml capacity dependent on mixer blade configuration. Net chamber volume with Cam Blades inserted is 420 ml and batch size can be corrected for composition density to provide proper fill of the mixing bowl using the following calculation: Batch weight=calculated SG*(500/1.58) (formula 'a'). The empirical relationship was based on relatively good mixing at a batch weight of about 500 g at a 75% fill factor with SG about 1.58. At a constant mixer volume, batch weight is adjusted with a change in SG of each batch for good mixing. V=mass/density; when V is constant, $M_1/D_1=M_2/D_2$ or $M_2=M_1 D_2/D_1$. For the compositions in this study, this provided batch sizes of about 360 to 400 g. The design of the Cam Blades as a medium shear-rate blade imposed milling, mixing and shearing forces against the test sample, alternating compacting and releasing the material within the chamber. The gear offset of the mixer was a 3:2 drive blade to driven blade gear ratio (for every three rotations of the drive blade, two rotations of the driven blade), with the drive blade being powered directly by the drive motor and the driven blade rotating on the gearing built into the mixing bowl.

First, the base resins were added into the mixing bowl with the blades rotating at 15 rpm. The process temperature set point for both zones was 170 or 180° C. depending on the melt temperature of the compound. The rotor speed was then increased to 40 rpm until full fluxing was reached. The mixing speed was reduced to 20 rpm to add the remaining ingredients (i.e., antioxidants, other liquid components). Once the additives were loaded, the ram arm closure assembly was lowered and mixing speed was increased to 40 rpm. Duration of the mixing cycle was 3 min. When completed, the molten material was backed out of the mixer using tweezers, collected, placed between two Mylar sheets, and compression molded at room temperature into a flat pancake. The cooled sample was cut into small squares and strips for plaque preparation and granulation using a #3 Armature Greenerd Arbour press and large cutting knife. Additional compounding was also carried out using Haake mixers. The mixing steps or compound step is as follows. First, the PP and TPE with a certain ratio were fed into a Haake mixer at 190° C. (about 3 min.) to melt the polymer. The FR (FP2100J) was added and mixed for another 3 min. to a homogenous blend. The mixture was removed, cooled to room temperature, and compression molded via a molder, Haoli XLB-D350*350*1 (Changzhou No. 1 Plastic and Rubber Equipment Ltd. Co.), according to the requirements of each of the test methods below.

Plaque Preparation.

Samples were compression molded using a Greenard Hydrolair steam press (with quench cooling capability) operated in the manual mode. One 8×8 50-mil plaque for each sample was prepared. The press was preheated to 180° C. (15° C.). A total of 85 g of material was pre-weighed and placed in the center of a 50-mil stainless steel plaque between the mold assembly made up of mold release treated Mylar and aluminum sheets. The filled mold was then placed into the press at 500 psi for 3 min., and the pressure was increased to 2,200 psi for 3 min. Steam/water switching occurred 15 seconds prior to the 3-min. mark and the sample was quench-cooled for 5 min. at the high pressure setting.

Granulation.

Samples were granulated using a Thomas-Whiley ED Model 4-knife mill (grinding chamber with rotor with 4 adjustable cutting blades operating edge against edge with 4 stationary blades; gap size between the stationery and adjustable blades set to 0.030-inch; operating speed of rotating head set at 1,200 rpm; 6-mm screen). Granulated material was collected in a product receiver at the base of the instrument, for extrusion or plaque preparation.

Material Drying.

Before lab extrusion or specimen preparation, granulated material was vacuum dried (at least 6 hrs at 85° C., high vacuum (<2.0" Hg)) to remove free moisture that might cause porosity or material degradation, enclosed in a foil bag and cooled to room temperature prior to the lab extrusion work.

Brabender Tape Extruder.

A 3-barrel zone, 25:1 L/D, ¾" Brabender extruder with 1"×0.020" "coat hanger slit" type tape die was used with a 3:1 compression ratio metering screw. No breaker plate or screen pack was used. Zone temperatures were set at 170, 175, 180, and 180° C. from feed throat to die, respectively. Vacuum dried tape samples were extruded with a screw speed starting at 20 rpm and about 6 meters of tape samples were collected on a moving Teflon-coated conveyor belt (about 1 m bed length and 1 m/min. speed capacity). Screw and conveyor belt speeds were adjusted for a tape thickness of about 0.018" (0.457 mm).

Tensile Test Samples.

Extruded tape samples were conditioned for 40 hours (controlled environment) at 73.4° F. (+/−6° F.) with 50% (+/−5%) relative humidity (RH), and then cut with an arbor press and an ASTM-D638 Type IV tensile bar die (providing 4.5") overall dogbone specimen length (11.43 cm) with 0.250° wide test zone (7.62 cm)).

Mini Wire Line.

A 3-barrel zone, 25:1 L/D, ¾" Brabender extruder (0.050" tip (1.27 mm); 0.080 die) was used with a 3:1 compression ratio metering screw. No breaker plate or screen pack was used. The bare copper conductor was 18 AWG/41 strands with nominal diameter of 0.046 inches (1.168 mm). Zone temperatures were set at 180° C. for all zones including the die. Wire coated samples were cooled in a water trough 4 to 5 inches (10-13 cm) from the die. Vacuum-dried samples were extruded at a screw speed of 25 to 30 rpm, adjusted for a 0.085" (2.16 mm or 85 mils) target diameter for about 0.020" (20 mils) wire coating thickness. A minimum 60 feet (18 m) of wire-coated samples were collected on a moving conveyor belt (speed at 15 feet/min. (4.57 m/min.)).

Tensile Testing.

Tensile testing was conducted on a INSTRON Renew 4201 65/16 and 4202 65/16 apparatus using a special 2-speed protocol to provide secant modulus followed by tensile and elongation at break measurements. Tensile tests are carried out according to ASTM D638 at room temperature. A time-based displacement method is used to determine the secant modulus strain levels to eliminate difficulties with extensometer slippage and poor resolution at low extension levels used for the modulus test. For the ASTM Type IV dogbone used, strain is assumed to occur over a 2.0" effective length (50 mm). Therefore, a 1% strain increment corresponds to a 0.50-mm jaw movement and, at 50 mm/min test speed, equals 0.010 min (0.6 sec.). To eliminate "start-up" noise and pre-tension the specimen, the secant modulus with a "starting load" was calculated at 0.4 seconds, with 1% load measurements at 1 sec., 2% load at 1.6 sec., and 5% load at 3.4 sec. The 1% secant load equals the 1-sec. load minus the 0.4-sec. load; the 2% secant load equals the 1.6-sec. load minus the 0.4-sec. load, etc. This load is used in the standard secant modulus calculation; e.g., 2% secant modulus=(2% secant load) measured specimen cross-sectional area). At 18 sec. (30% elongation), the testing speed automatically increased to 500 mm/min. then completed the tensile to break portion of the testing. Standard deviation for 5 repeat specimens on 1% secant modulus is typically <5% of average value using the time-based strain method, versus the standard deviation often above 25% of average value with the prior extensometer-based strain method. Since the INSTRON program for this testing is based on 2.0" (50 mm) effective strain length (Type IV dogbone), values were calculated for each test run.

Heat Deformation/Wire.

This test is used to establish the resistance to deformation of wire or cable insulation or jacket at elevated temperatures. The apparatus consists of a forced-circulation air oven, temperature-measuring device with an accuracy of ±1° C., and dial micrometer having flat surfaces on both the anvil and the end of the spindle with a diameter of 6.4±10.2 mm (0.25±0.01 in) and exerting a force of 300 g (weight as specified in the product standard). Test specimens (mini wire line with covering, 25 mm (1") length) were marked at the position where the foot of the weight is applied, and initial thickness determined. Test apparatus and specimens were conditioned in the air oven at the specified temperature for 1 hour unless otherwise specified. The specimen while in the oven is then placed under the foot of the weight at the marked position for 1 hour unless otherwise specified, then removed from under the foot of the weight and, within 15 seconds, the thickness at the marked position is measured. Heat deformation testing can be conducted according to UL 1581-2001. For each formulation, two parallel sample plaques are preheated at 150° C. in an oven (1 hour), pressed with the same loading at 150° C. (1 hour) and, without removal of weights, placed in an ASTM room (23° C.) for 1 hour, and change of thickness of the plaques recorded and heat deformation ratio calculated. The percent deformation (HD %) at a given test temperature is calculated from the formula: HD %=(T1−T2)/T1*100 (formula V), wherein T1 represents the original sample thickness (mm (in)) before the test and T2 represents sample thickness (mm (in)) after deformation.

Heat Deformation/Plaque.

Heat deformation testing is conducted according to UL 1581-2001. The test sample is cut from a compression molded (190° C.) plaque (1.44 mm thick). For each formulation, 2 parallel sample plaques are preheated in an oven (150° C., 1 hour), pressed with same loading (150° C., 1 hour), and, without removal of weights, placed in an ASTM room (23° C.) for 1 hour. Change of thickness of the plaques is recorded and heat deformation ratio calculated according to HD %=$(D_0-D_1)/D_0$*100%, wherein $D_0$=original sample thickness and $D_1$=sample thickness after deformation process. Calculated ratios for the two parallel samples are averaged.

VW-1 Burn.

This test is performed in accordance with the VW-1 Flame Test, Section 1080, of the UL-1581 testing standard, on the fabricated wire or cable specimens to confirm resistance to vertical propagation of flame and dropping of flaming particles. The set up includes a special Bunsen burner with methane flame (ASTM 2556 standard). A nominal 20" long test specimen (50.8 cm) is supported in a vertical position with the 500 watt burner flame impinging at a 45° angle near the base, a cotton bed at the base establishes failure by flaming drip and a flag on top shows failure at a given measured length to determine failure by propagation of flame. Specimen ignition is by five 15-sec. exposures of the burner. An additional requirement is that the specimen self-extinguish within 60 sec. of the removal of the burner. Typically, 3 specimens per sample are evaluated for the formulation screening studies. The wire or cable specimen from a mini-wire line is conditioned at room temperature (min. 24 hours) and straightened. A strip of Kraft paper (12.5±1 mm (0.5±0.1") wide), gum side toward the specimen, is wrapped once around the specimen with its lower edge about 254±2 mm (10±0.1") above the point at which the inner blue cone of the flame impinges on the specimen, and the ends pasted together evenly and trimmed to form an indicator flag that projects about 20 mm (0.75 in) opposite to the side to which the flame is applied. On a flat specimen, the flag is projected from the center of the broad face of the specimen. The specimen, apparatus and surrounding air are at room temperature. The lower specimen support is at least 50 mm (2 in) below the point at which the inner blue cone of the flame impinges on the specimen, and the upper support is at least 50 mm (2 in) above the top of the Kraft paper flag. A continuous horizontal layer of cotton is placed on the floor of the test chamber, centered on the vertical axis of the test specimen, extending 75 to 100 mm (3 to 4 in) outward in all directions except in the direction of the burner, with upper surface about 235±6 mm (9.25±0.25 in) below the point at which the tip of the blue inner cone of the flame impinges on the specimen. With the burner vertical, the height of the test flame is adjusted to 125±10 mm (5.0±0.4 in), with an inner blue cone 40±2 mm (1.5±0.1 in) in length. The burner is then positioned on the angle block, with its barrel at an angle of 20° to the vertical. The angle block is moved into position with the tip of the inner blue cone of the flame impinging on the outer surface of the specimen for 15 sec., and moved away for 15 sec.; this cycle is repeated for 5 applications of the flame using a smooth and quick movement of the angle block and minimal disturbance of the chamber air. When flaming of the specimen persists longer than 15 sec. after removal of the burner flame, the burner flame is not re-applied until immediately after the flaming ceases. After the test is completed, the exhaust system is activated to remove smoke and fumes from the chamber. During and after the test, the following is recorded: a) % indicator flag uncharred (from flag to first visible sign of physical damage other than simply scorched or soot covered): the portion of the Kraft paper in contact with the specimen is not considered part of the flag); b) any ignition of the cotton; flameless charring of the cotton is typically ignored; and c) time for flaming of specimen to self-extinguish, after the end of each application of the burner flame. The results include the uncharred length, any ignition of the cotton and indication if flaming of the specimen exceeds 60 sec. after removal of the burner flame following any application.

Flame Retardancy (FR).

Mimic VW-1 FR test, which characterizes FR performance, is conducted in an UL94 chamber with specimen size limited to 200*2.7*1.9 mm. The specimens are hung on a clamp with longitudinal axis vertical by applying 50 g loading on the distal end. One paper flag (2*0.5 cm) is applied on the top of the wire. The distance of flame bottom (highest point of the burner oracle) to the bottom of flag is 18 cm. Flame is applied for 45 continuous seconds. After flame time (AFT), uncharred wire length (UCL), and uncharred flag area percentage (flag uncharred) is recorded during and after combustion. Four or five specimens are tested for each sample. Any of the following constitutes "not pass": (1) cotton under the specimen is ignited, (2) the flag is burned out, and (3) dripping with flame.

Volume Resistivity (VR).

A Hewlett-Packard High Resistivity Meter is used to measure volume resistivity. The conductance or resistance of a material is determined from a measurement of current or voltage drop under specified conditions. By using the right electrode system, surface and volume resistance may be measured separately. Resistivity is calculated using specimen dimensions. Product specimens are visually examined for voids, creases, thin spots and cracks in the surface prior to punching them out; these imperfections in the plaque are avoided. A 50-mil plaque cut into 3.5-in diameter discs is typically used. Test voltage is set to 500V. For all VR measurements, 2 specimens were prepared and tested in a 3 stage sequence: (1) vacuum dried at 80° C. (overnight) and tested, (2) 2-hour distilled water immersion (test specimen #1 only), and (3) 48-hr. immersion and tested (test specimen #1 only). Also, run specimen #2 directly at 48 hrs. after immersion in water at room temperature. This is done to reduce work load and optimize lab efficiency by almost 33% without loosing critical details.

Wet Insulation Resistance.

An about 10-meter length wire sample prepared by the Brabender tape extruder was tested for insulation resistance/wet insulation resistance (IR/wet IR). Before testing, both ends of the jacketing are peeled off about 1.5 cm and the copper is twisted together. The sample was immersed in distilled water and 500 V DC was applied between conductor and the water during testing for both IR and wet IR. For IR testing, the wire sample was measured by withstand voltage tester after applying the DC for one minute. For wet IR testing, the wire sample was immersed in water previously grounded for one hour and then measured in the same manner according to:

$$\rho_0 = 2{,}725 \times \frac{L \times R}{lg\frac{D}{d}}$$

where $\rho_0$ is the insulation volume resistivity, expressed in ohm millimeters; L is the immersed length of the test sample in millimeters; R is the measured insulation resistance in ohms; D is the outside cable diameter in millimeters; d is the conductor diameter in millimeters; and 1 g is logarithm to the base 10.

Table A and B (below) list formulations and properties of the following composites of polypropylene/thermoplastic elastomers/flame resistant compounds (PP/TPE/FR). Examples IE are examples of the invention and CE are comparative examples. Formulation components are reported in weight percent of the composition.

Key customer specifications for halogen-free flame retardant (HFFR) wire and cable compositions include a tensile stress >5.8 MPa, tensile elongation >200% and heat deformation ratio<50% at 150° C. The inventive samples (IE) were made by a Haake mixing process, and elongation would be further increased through twin-screw extrusion processing

TABLE A

| Component (wt %) | IE-1 | IE-2 | IE-3 | IE-4 | IE-5 | IE-6 | CE-1 | CE-2 | CE-3 | CE-4 | CE-5 |
|---|---|---|---|---|---|---|---|---|---|---|---|
| PP 6D83K | | | | | | | 44.0 | 44.0 | 44.0 | 44.0 | |
| PP(C715-12) | 27.0 | 27.0 | 36.0 | 30.0 | 27.0 | 24.0 | | | | | 60 |
| VERSIFY DE3300 | | | | | | | 11.0 | 11.0 | 11.0 | 11.0 | |
| VERSIFY DP3200 | 33.0 | | | | | | | | | | |
| VERSIFY DP4200 | | 33.0 | | | | 36.0 | | | | | |
| VERSIFY DE4301 | | | 24.0 | 30.0 | 33.0 | | | | | | |
| APP CROS C30 | | | | | | | 30 | 22.5 | 22.5 | 30 | |
| MPP Budit 311 | | | | | | | 15 | 22.5 | | | |
| MPP Budit 3141 | | | | | | | | | 22.5 | 15 | |
| FP2100J | 40.0 | 40.0 | 40.0 | 40.0 | 40.0 | 40.0 | | | | | 40 |
| Total | 100 | 100 | 100 | 100 | 100 | 100 | 100 | 100 | 100 | 100 | 100 |
| Tensile Strength, Mpa | 11.1 | 11.1 | 12 | 11 | 12.9 | 14.4 | 16* | 13.5* | 12.6* | 14.4* | 15.6 |
| Tensile Strength, psi | 1609.5 | 1609.5 | 1740 | 1595 | 1870.5 | 2088 | 2323* | 1957.5* | 1827* | 2088* | 2260 |
| Elongation, % | 491 | 476 | 468 | 497 | 568 | 580 | 416* | 313* | 206* | 321* | 15 |
| HD @150° C. | 22 | 19 | 2 | 16 | 44 | 30 | 23 | 20 | 23 | 24 | — |
| 5% Secant Modulus, Mpa | 202 | 191 | 227 | 191 | 157 | 182 | 280* | 279* | 288* | 283* | 330 |
| 5% Secant Modulus, Psi | 29290 | 27695 | 32915 | 27695 | 22765 | 26390 | 40600* | 40455* | 41760* | 41035* | 47850 |
| Mimic VW-1(Pass/Total) | 5/5 | 6/6 | 5/5 | 5/5 | 4/4 | 5/5 | 0/4* | 0/4* | 0/4* | 0/4* | 4/4 |

Tensile Speed: 500 mm/min
*Tensile speed: 50 mm/min

TABLE B

| Component (wt %) | IE-7 | IE-8 | IE-9 | IE-10 | IE-11 | IE-12 |
|---|---|---|---|---|---|---|
| PP(C715-12) | 30.0 | 20.0 | 20.0 | 20.0 | 23.0 | 27.0 |
| SEBS(G1643M) | 30.0 | | 10.0 | 25.0 | 27.0 | 17.0 |
| SEBS(G1651ES) | | 40.0 | 30.0 | 15.0 | 10.0 | |
| VERSIFY DE 4301 | | | | | | 16.0 |
| FP2100J | 40.0 | 40.0 | 40.0 | 40.0 | 40.0 | 40.0 |
| Total | 100 | 100 | 100 | 100 | 100 | 100 |
| Tensile Strength, Mpa | 9.3 | 11.6 | 13.6 | 11 | 9.9 | 9.2 |
| Tensile Strength, psi | 1348.5 | 1682 | 1972 | 1595 | 1435.5 | 1334 |
| Elongation, % | 500 | 393 | 560 | 590 | 573 | 485 |
| HD @150° C. | 37 | 4 | 9 | 26 | 33 | 9 |
| 5% Secant Modulus, Mpa | 103 | 105 | 89 | 52 | 68 | 152 |
| 5% Secant Modulus, psi | 14935 | 15225 | 12905 | 7540 | 9860 | 22040 |
| Mimic VW-1(Pass/Total) | 4/4 | 4/4 | 4/4 | 4/4 | 4/4 | 4/4 |

Tensile Speed: 500 mm/min

As shown in Table A and B, the inventive examples (IE) that are PP blended with a TPE and FP2100J N/P-based intumescent flame retardant containing a piperizine component, show both exceptional mechanical properties and flame retardant performance. Each inventive example (IE 1-12) passed the mimic VW-1 flame resistance (FR) tests. Surprisingly, each of IE 1-12 have heat deformation at 150° C. at less than 50% and, at the same time, excellent tensile strength (>9 MPa) and elongation (>200%). In contrast, the comparative composites (CE 1-4) made with PP, TPE and a FR that did not include a piperazine component did not pass the mimic VW-1 flame resistance (FR) tests. In addition, as shown in Table A, CE-5 made with PP and FP2100J but without TPE passed the mimic VW-1 FR test but has a very high 5% secant modulus of 47850 psi, poor elongation (<15%) and poor heat deformation. With the presence of TPE (VERSIFY and/or SEBS) in examples IE-1 to IE-12, the 5% secant modulus decreased below 33000 psi without loss of the heat deformation at 150° C.

Table C and Table D (below) list formulations and properties of the composites of PP/TPE/FR compounds.

The typical criteria used for W&C applications includes passing the VW-1 test for flame retardancy, heat deformation at 121° C. at <50%, and flexibility at <35,000 psi. In Table C, IE 1 and IE 2 show overall well-balanced properties including good flexibility, high flame resistance, high heat deformation and good wet electrical properties. CE 1 through CE 3 made with TPE(s) and the FR system without piperazine exhibited un-balanced properties. CE 1, a blend of OBC and VERSIFY resulted in low tensile strength and poor flame resistance. CE 2, a blend of ULDPE and VERSIFY had low tensile strength and poor heat deformation. IE 1 also demonstrates the use of BAPP with another solid intumescent FR provides good flame resistance and good flexibility. CE 3 is a single resin system which showed poor heat deformation performance at 121° C.

TABLE C

| | IE 1 | IE 2 | CE 1 | CE 2 | CE 3 |
|---|---|---|---|---|---|
| OBC INFUSE D9530 | | | 29.90 | | |
| VERSIFY 3000 | 45.80 | 49.80 | 29.90 | 29.90 | |
| VERSIFY 3200 | | | | | 65.8 |
| ULDPE (Attane 4404G) | | | | 29.90 | |
| Dow DS6D82 random PP | 10.00 | 10.00 | | | |
| Budit 3167 (std., 14 μm) | 40.00 | 40.00 | 40.00 | 40.00 | 30 |
| Chemtura BAPP | 4.00 | | | | 4 |
| Irganox 1010 | 0.20 | 0.20 | 0.20 | 0.20 | 0.2 |
| Tensile Strength @ Peak (psi) | 1813 | 1953 | 1336 | 1040 | 2175 |
| Tensile Elongation @ Break | 559 | 524 | 602 | 423 | 690 |
| 5% Secant Modulus (psi) | 14540 | 24176 | 17752 | 20372 | 8222 |
| VW-1 (pass/fail) | P | P | F | P | F |
| Heat Distortion (%, 80 C.) | — | — | 0 | 8 | 11.7 |
| Heat Distortion (%, 121 C.) | 34 | 28 | 86 | 77 | 100 |
| Wet VR (Soak 48 hr, ohm cm) | 2.8E+14 | 4.9E+16 | 1.8E+16 | 4.3E+16 | 2.4E+15 |

In Table D (below), IE 3 through IE 6 show well-balanced properties as with IE 1 and IE 2, and unexpectedly have even lower secant modulus than IE 1 but comparable heat deformation performance. Versify 3200, Versify 3300, Versify 2400 are the primary resins in IE 2 through IE 4, and it was unexpected that the blends with a primary phase of melting temperature (melting point, m. pt.) less than 85° C. exhibited good heat deformation at high temperatures of 121° C.

The loading level of intumescent FRs in IE 3 to IE 5 are much lower than the typical loading level required for VW-1 performance in other polyolefin-based formulations composed of intumescent N—P FRs without a piperazine component. The surprisingly good flame resistance in IE 3 to IE 5 indicates a burn synergist effect between the polymer resins and the FR packages used in IE 3 to IE 5. This effect is further demonstrated by CE 4 using an alternative intumescent FR (without a piperazine component), which exhibited poor flame resistance and did not meet VW-1 performance requirement. Compared to the high volume resistivity in IE 3 through IE 5, CE 4 also exhibited poor wet electrical properties.

TABLE D

| | IE 3 | IE 4 | IE 5 | IE 6 | CE 4 |
|---|---|---|---|---|---|
| VERSIFY 3300 (m. pt = 85° C.) | 35.8 | | | | |
| VERSIFY 3200 (m. pt = 62° C.) | | 40.8 | | 30.8 | 40.8 |
| VERSIFY 2400 (m. pt = 55° C.) | | | 36.1 | | |
| Dow DS6D82 random PP | 30 | 25 | 28.7 | 25 | 25 |
| Budit 3167 (standard, 14 μm) | 30 | 30 | 29 | 40 | |
| BAPP | 4 | 4 | 4 | 4 | 4 |
| Budit FR CROS 30 (without piperazine component) | | | | | 30 |
| Dynasylan 6498 | | | 2 | | |
| Irganox 1010 | 0.2 | 0.2 | 0.2 | 0.2 | 0.2 |
| Peak stress (psi) | 1698 | 2245 | 2467 | 1732 | 2329 |
| Elongation at break (%) | 635 | 657 | 774 | 590 | 552 |
| 5% Secant modulus (psi) | 10734 | 9408 | 7523 | 10268 | 14363 |
| VW-1 (pass/fail) | P | P | P | P | F |
| Heat deformation (%, 121 C.) | 46.8 | 44 | 40.5 | 22 | 52.1 |
| Wet VR (ohm · cm, 48 hr soak) | 3.3E+15 | 3.4E+15 | 3.9E+15 | 4.6E+14 | <4.1E+09 |

Although the invention has been described with certain detail through the preceding specific embodiments, this detail is for the primary purpose of illustration. Many variations and modifications can be made by one skilled in the art without departing from the spirit and scope of the invention as described in the following claims.

The invention claimed is:

1. A flame-retardant polymer composition, comprising:
   A. greater than 20 to 40 wt % propylene polymer;
   B. 20-40 wt % thermoplastic elastomer (TPE); and
   C. at least 10 wt % intumescent flame retardant (FR) system comprising:
      (i) 35-45 wt %, based on the weight of the FR system, of an organic phosphoric acid salt type intumescent halogen-free flame retardant; and
      (ii) 55-65 wt %, based on the weight of the FR system, of a piperazine component;
   with the proviso that the composition is halogen-free.

2. The composition of claim 1 having a 5% secant modulus up to 35,000 psi.

3. The composition of claim 1 in which the piperazine component is selected from the group consisting of piperazine pyrophosphate, piperazine orthophosphate, piperazine polyphosphate, a polytriazinyl compound comprising a piperazine group, and an oligomer or polymer 1,3,5-triazine derivative comprising a piperazine group.

4. The composition of claim 1 in which the flame retardant system comprises (A) a blend of a nitrogen-phosphorous intumescent compound and piperazine pyrophosphate, (B) a blend of (1) ammonium polyphosphate, (2) a piperazine compound, and (3) a melamine coating, or (C) a combination thereof.

5. The composition of claim 1 in which the thermoplastic elastomer is selected from the group consisting of styrenic block copolymers, propylene/α-olefin copolymers, ethylene/α-olefin copolymers, ethylene interpolymers, and olefin block copolymers.

6. A wire or cable sheath made from the composition of claim 1.

7. The wire or cable sheath of claim 6 having flame retardancy effective to pass VW-1 test, and a heat deformation effective to pass UL1581-2001 test at minimum 80° C.

8. The wire or cable sheath of claim 7 having a heat deformation effective to pass UL1581-2001 test at 121° C. or at 150° C.

* * * * *